United States Patent [19]

Signoret et al.

[11] Patent Number: 5,105,729
[45] Date of Patent: Apr. 21, 1992

[54] CONTROLLED VALVE WITH AUTOMATIC OPENING AND AIRCRAFT WITH A VALVE OF THIS TYPE

[75] Inventors: Jacques Signoret, Toulouse; Jacques Fraisse, Auzielle; Bruno Baroux, Toulouse; Francis Carla, St.Orens de Gameville, all of France

[73] Assignee: ABG-Semca, Toulouse Cedex, France

[21] Appl. No.: 338,159

[22] Filed: Apr. 14, 1989

[30] Foreign Application Priority Data

Apr. 18, 1988 [FR] France .................. 88 05068

[51] Int. Cl.$^5$ .................................... B64D 13/04
[52] U.S. Cl. .......................... 454/74; 137/82; 137/487.5
[58] Field of Search ............... 98/1.5; 251/82; 137/487.5

[56] References Cited

U.S. PATENT DOCUMENTS

| | | | |
|---|---|---|---|
| 1,367,911 | 2/1921 | Koplin | 251/82 |
| 2,393,343 | 1/1946 | Schroeder | 98/1.5 |
| 2,504,006 | 4/1950 | Davis | 251/82 |
| 2,515,639 | 7/1950 | Draney | 98/1.5 X |
| 2,773,440 | 12/1956 | Arthur | 98/1.5 |
| 3,375,771 | 4/1968 | Balcom, Jr. | 98/1.5 |
| 4,029,290 | 6/1977 | Karpenko | 251/82 |

FOREIGN PATENT DOCUMENTS

| | | |
|---|---|---|
| 1568450 | 4/1969 | France . |
| 2238880 | 2/1975 | France . |
| 2244953 | 4/1975 | France . |

*Primary Examiner*—Harold Joyce
*Attorney, Agent, or Firm*—Oblon, Spivak, McClelland, Maier & Neustadt

[57] ABSTRACT

A controlled valve with automatic opening and an aircraft having a valve of this type. The controlled valve enables the regulation of pressures or flow rates. Furthermore, the control valve can open autonomously under the effect of a pressure difference exceeding a pre-determined threshold. Thus, it enables fast balancing of pressures if the pressure difference should exceed a threshold beyond which, for example, an installation may be put in danger. The controlled valve can be applied to any device for the regulation of pressure and/or flow rate between a chamber and the exterior or between two chambers having a safety balancing device. The disclosure can be applied notably in aeronautical construction, the construction of petroleum refineries, of fluid distribution devices and of chemical reactors.

4 Claims, 8 Drawing Sheets

CONTROLLED VALVE WITH AUTOMATIC OPENING AND AIRCRAFT WITH A VALVE OF THIS TYPE

BACKGROUND OF THE INVENTION

1. Field of the Invention

The invention relates chiefly to a controlled valve (defined herein as a valve that operates under a control applied to it) with automatic opening and an aircraft comprising a controlled valve of this type.

2. Description of the Prior Art

There are prior art controlled valves which, under command or actuation, make it possible to let through a desired flow rate of a fluid between, for example, two chambers within which different pressures prevail. The prior art type controlled valves enable the regulation of flow rates or pressures. To enable stable regulation, the controlled valves are designed to work in a determined range of flow rates. Thus, it is not possible, by command, for example in the event of trouble, to get the pressures balanced by fast and complete opening of the controlled valve. Furthermore, the prior art type controlled valves act only upon external actuation. Thus, the malfunctioning of the external actuating device makes the controlled valve completely ineffective.

Thus, in the case of the most common uses, there are no safety means available to balance the pressures. In advanced technologies, such as, for example, in aeronautics, clack valves (defined herein as valves that open and shut automatically under pressure applied to them) are used: these clack valves are designed to open if the difference in pressure between their two faces goes beyond a predetermined threshold.

But, it turns out that the fact of having a clack valve or a controlled valve on a partition between, for example, two chambers or between one chamber and the outside, raises major problems. Firstly, there should be the space needed for the controlled valve and the clack valve. This is not always the case, notably if the controlled valves and clack valves have to be placed, for example, on a piping system that connects the tubes of chemical reactors or the points of a (for example) petroleum distillation tower.

Furthermore, the fact of making an opening needed for the controlled valve and the clack valve to pass through embrittles the wall. This embrittlement could be partially compensated for by a structure which is, for example, metallic, positioned around the controlled valve and the clack valve. However this metallic structure is costly and heavy. The additional weight has particularly serious implications in the context of aircraft manufacturing.

SUMMARY OF THE INVENTION

The invention consists of a controlled valve comprising means enabling its automatic, autonomous opening when the difference in pressure on the two faces exceeds a threshold. These means prevent the opening of the controlled valve for as long as the threshold of the pressure difference has not been reached. The opening takes place automatically when the forces resulting from the difference in pressure are no longer balanced by the forces keeping the controlled valve either closed or partially opened. The opening of the controlled valve, so long as the difference in pressure has not reached the desired threshold, is prevented, for example, by the weight of the controlled valve, by springs, by magnets and/or by electromagnets. The valve is opened to the full extent either by translation or by rotation, advantageously on an shaft placed non-symmetrically with respect to the axis of symmetry of the valve.

In one alternative embodiment, the opening of the controlled valve is not complete but, in all cases, it is sufficient to achieve a quick balancing of pressures.

The device according to the present invention enables the number of holes, that have to be made in the wall supporting it, to be limited to only one. Thus, the embrittlement of the wall is minimized and the weight is reduced by the elimination of a structure surrounding the opening while, at the same time, reducing the cost of fabrication. Furthermore, in cases where the available surface is limited, the device according to the present invention enables the making of a single opening which is bigger, instead of two openings, one designed for the controlled valve and the other for the clack valve. Thus, with the device according to the present invention, it is possible to make controlled valves that have greater exchange surfaces and, thereby, to improve the working and the safety of the device.

The invention also concerns an aircraft having a controlled valve according to the present invention.

The invention also concerns an aircraft wherein this controlled valve is a ventilation valve designed to balance the external and internal pressures when the aircraft is on the ground.

Another object of the invention is an aircraft wherein, under the influence of an excessive external pressure, the controlled valve opens inwards with respect to the aircraft.

BRIEF DESCRIPTION OF THE DRAWINGS

The invention will be better understood from the following description and the appended figures, given as non-restrictive examples. Of these figures:

In FIGS. 1 to 9 the same references are repeated to designate the same elements.

DESCRIPTION OF PREFERRED EMBODIMENTS

Figure 1:
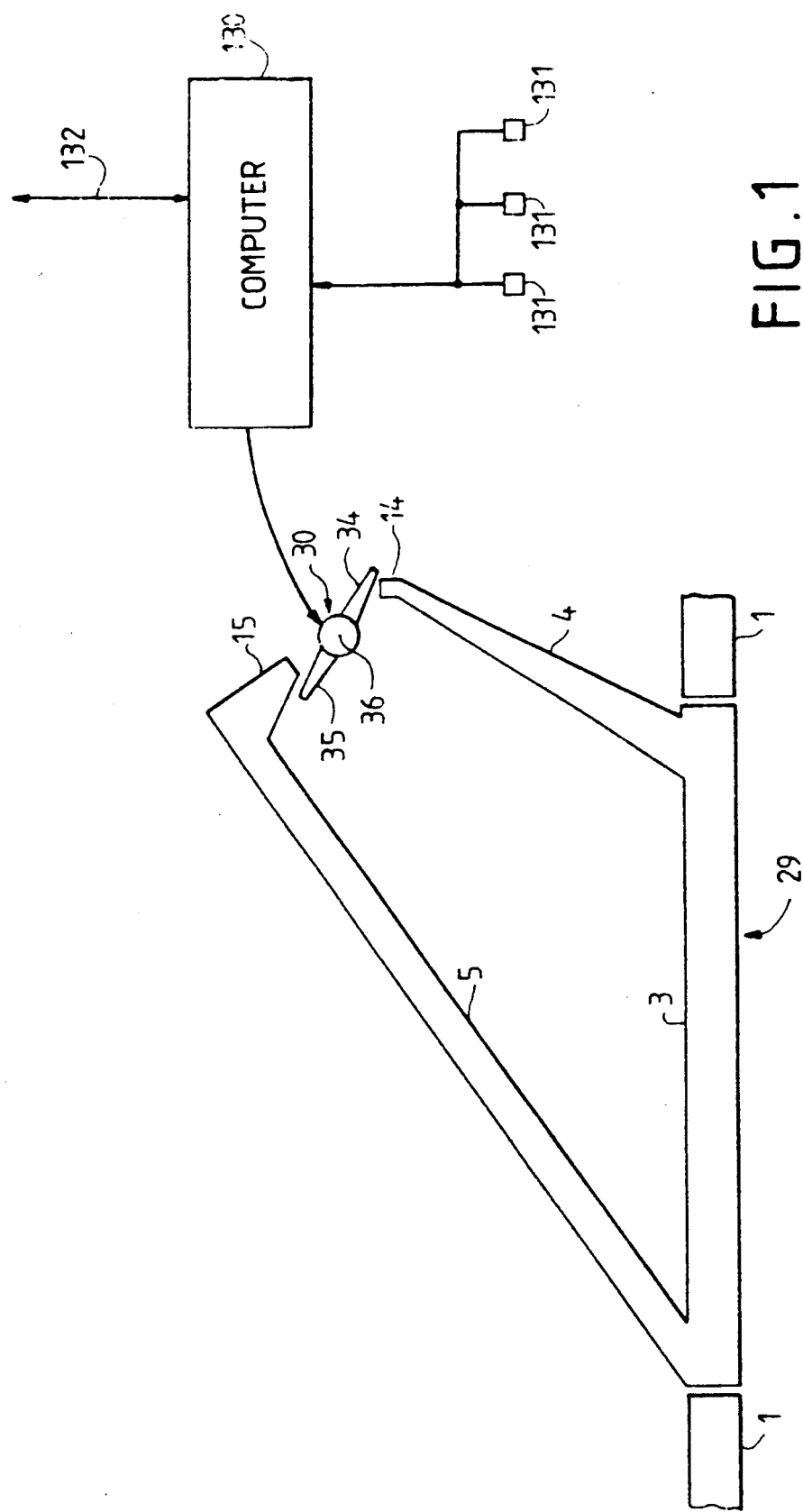
FIG. 1 is a drawing showing a first embodiment of a device according to the present invention.

FIG. 1 shows a first embodiment of a controlled valve with automatic opening, according to the present invention. The controlled valve 29 has a flap 3 which, in the closed position, makes the wall 1 impervious. The controlled valve 29 according to the present invention has means 30, enabling the partial or total opening, upon actuation, of the controlled valve. The opening of the controlled valve enables the difference in pressure prevailing on the two faces of the wall 1 to be reduced. In the example shown in the figures, the controlled valve 29 rotates on a shaft 36. The rotation of the flap 3 of the controlled valve 29 uncovers a space enabling the exchange of fluid. For one and the same pressure difference, the uncovering of a greater area enables an increase in the flow rate.

The opening of the flap 3 of the controlled valve 29 is obtained, for example, by a translation of the flap 3, either in parallel or perpendicularly to the wall 1. Advantageously, the flap 3 undergoes a rotation around the shaft 36. The rotation around the shaft 36 is, for example, obtained by the driving of the two struts 4 and 5. This driving results, for example, from the traction of an arm 35 on the end 15 if the strut 5 or the thrust of an arm 34 on the end 14 of the strut 4.

Figure 4:
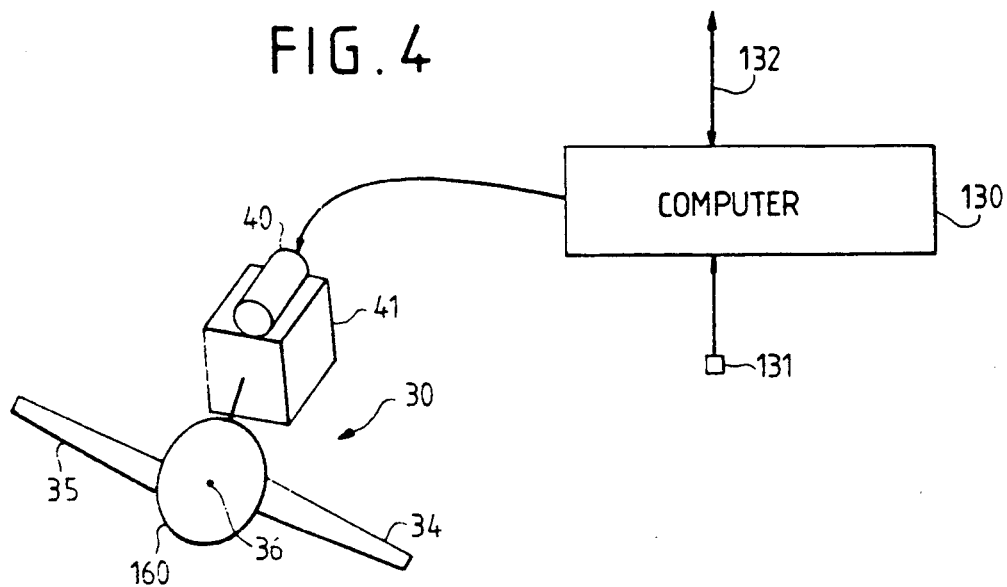
FIG. 4 is a drawing showing a first exemplary embodiment of a detail of FIG. 1.
Figure 5:
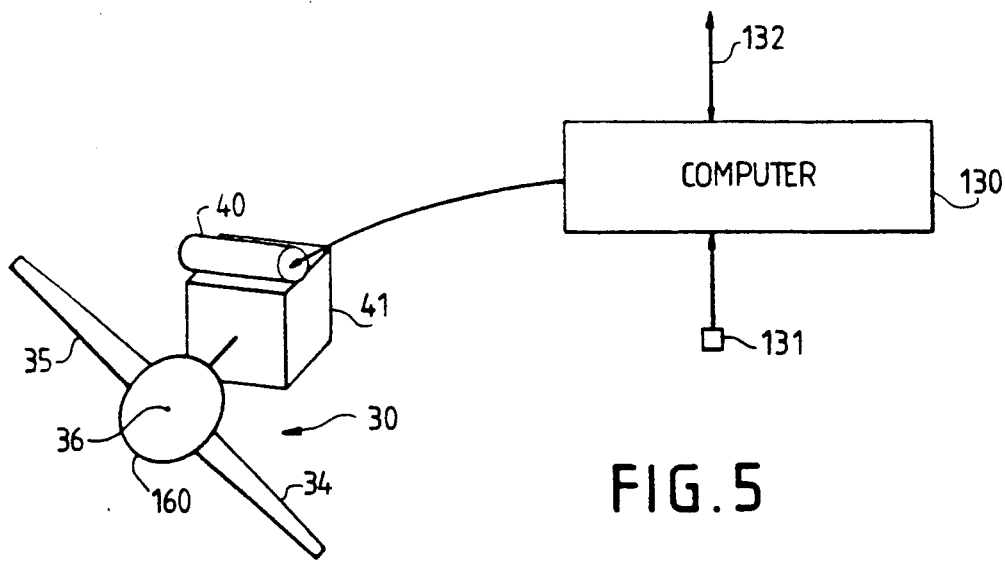
FIG. 5 is a drawing showing a second exemplary embodiment of a detail of the device of FIG. 1.

Advantageously, the arms 34 and/or 35 form part of a driving device 30 as shown in FIG. 4 or 5. In the exemplary embodiment shown in FIG. 1, the arm 35 pulls on the end 15 of the strut 5. The strut 5 has, for example, an angle of between 80° to 130° with respect to the arm 35.

In the exemplary embodiment shown in FIG. 1, the arm 34 rests on the end 14 of the strut 4, placed substantially in the extension of the strut.

The controlled valve 29 receives commands to open it or close it. The commands are transmitted mechanically, hydraulically, pneumatically or, advantageously, electrically. Advantageously, as shown in FIG. 1, the valve 29 is controlled by a computer 130. The computer 130 is connected, for example, firstly to sensors 131 and, secondly by a connection 132 to, for example, other computers. The sensors 131 enable, for example, the acquisition of the values of the pressure at various points. In the case of aeronautic uses, the computer 130 will be connected by the connection 132 to the main computer which will give it an indication of the value of the pressure outside the aircraft.

The computer 130 has a program for the control of the controlled valve 29, according to the criteria of pressure acquired by the sensors 131 and received through the bus 132, and according to the controls coming, for example, from the pilot of the aircraft, received on the line 132.

Figure 2:
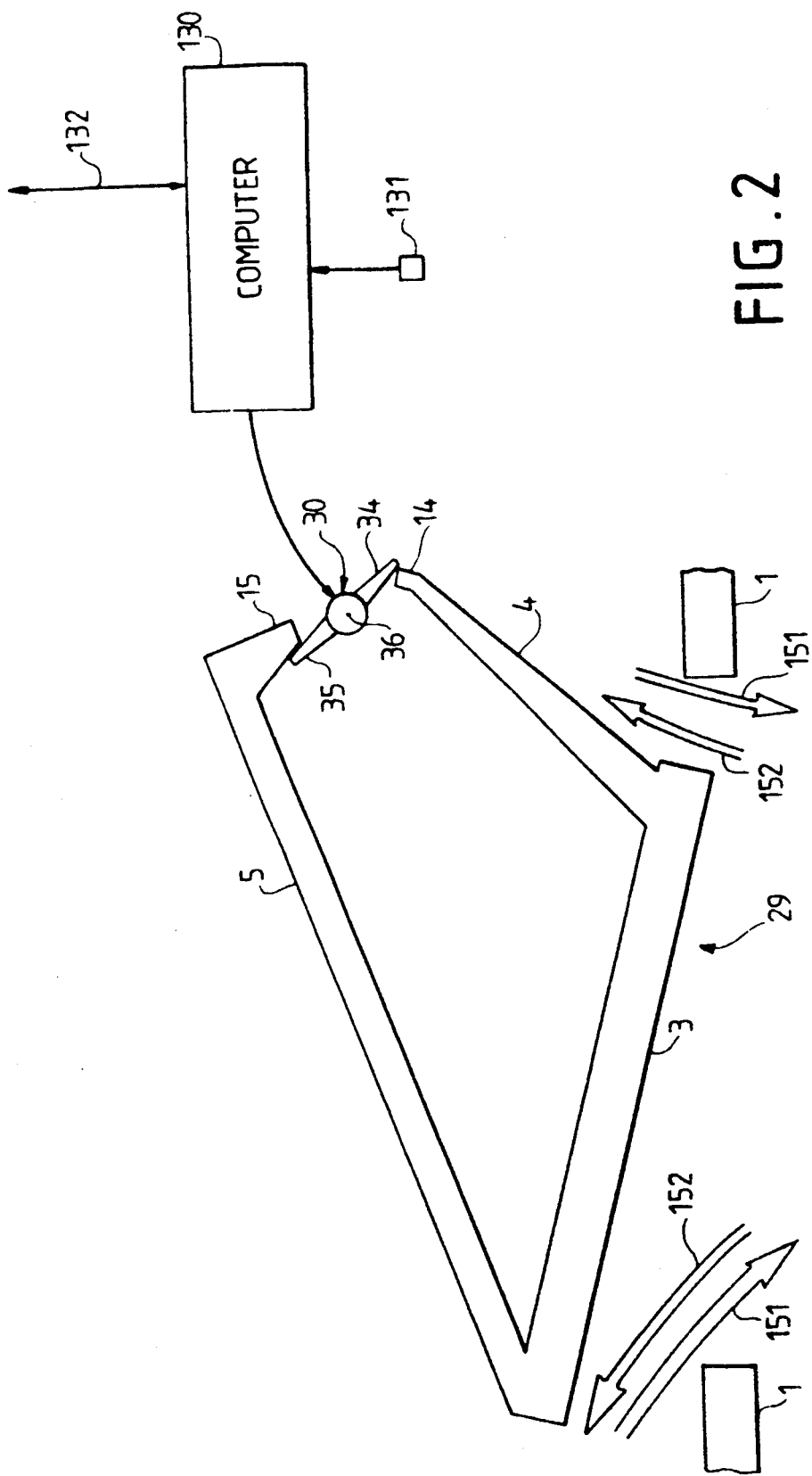
FIG. 2 is a drawing showing the device of FIG. 1 in the opened position.

FIG. 2 shows the controlled valve 29 according to the present invention, partially opened. The opening was achieved by the rotation of the driving means 30. Depending on the surface uncovered, a flow of fluid is obtained between the two sides of the controlled valve 29. In the example illustrated in the figures, the valve 29 opens inwards. In a case such as this, if the internal pressure is greater than the external pressure, the flow carries the reference 151. If not, the flow of fluid carries the reference 152 in FIG. 2.

The controlled valve 29 remains in the position shown for as long as the means 30 have not received a new command from the computer 130, ensuring either a greater opening or the reduction of the opening or the complete closing of the controlled valve.

Figure 3:
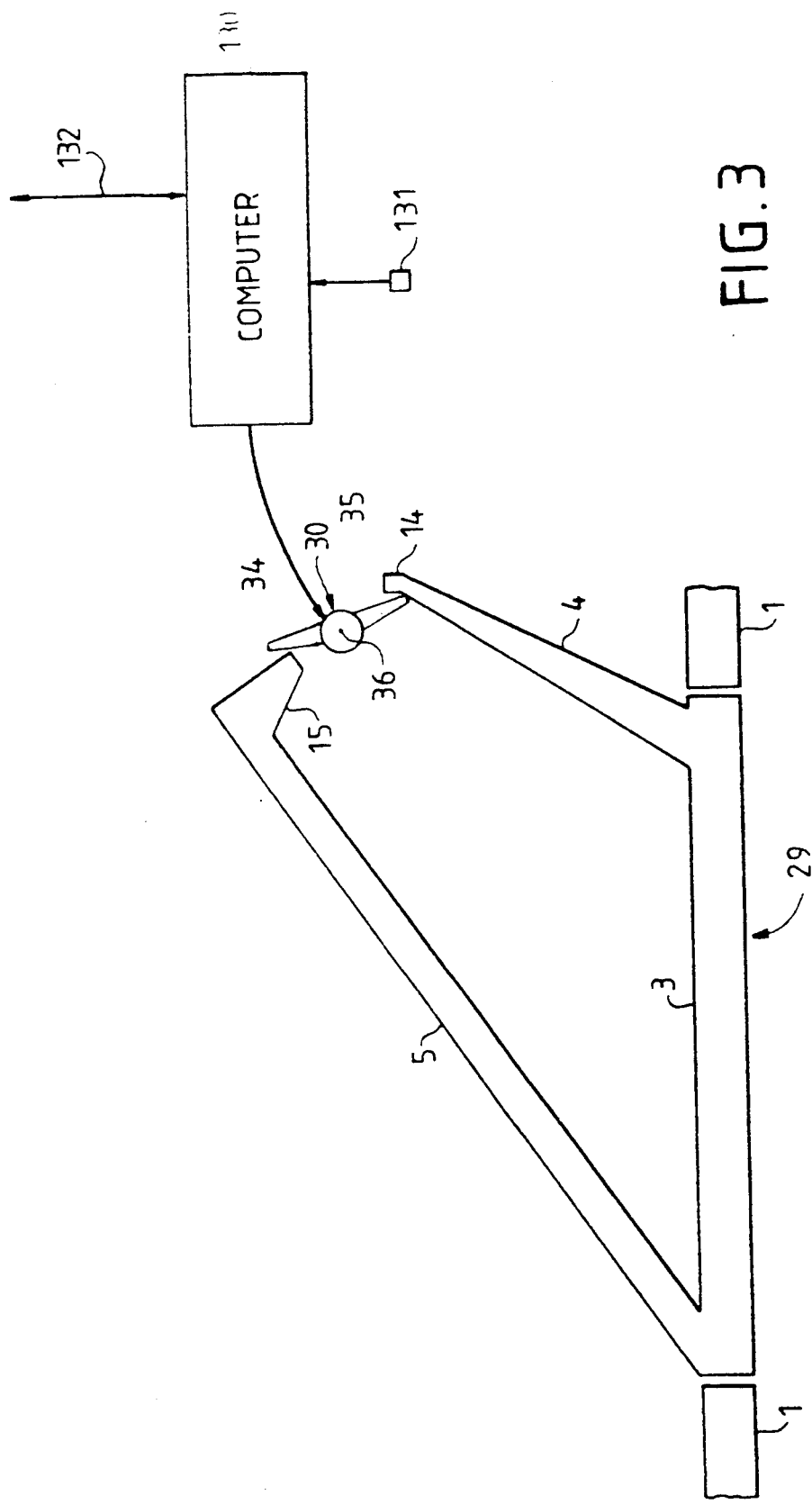
FIG. 3 is a drawing showing the device of FIG. 1 locked in the closed position.

It may prove to be necessary to provide for hermetic isolation by the valve 29, and to do so independently of the internal and external pressure conditions. For example, a ventilation valve of an aircraft should imperatively be closed if it is beneath the waterline if it lands on water. Advantageously, in the case of the device according to the present invention, the blocking is obtained by the means 30. In the exemplary embodiment shown in FIG. 3, the arms 34, which normally rest on the end 14 of the strut 4, block the controlled valve 29 in resting on the end 15 of the strut 5. To do so, the means 30 have performed a rotation on the shaft 36, in the trigonometrical direction, in the case of the figure until, firstly, the closing of the controlled valve 29 and then its blocking are obtained. Advantageously, the arm 35 leans on the end 14 of the strut 4 for greater security.

Figure 9:
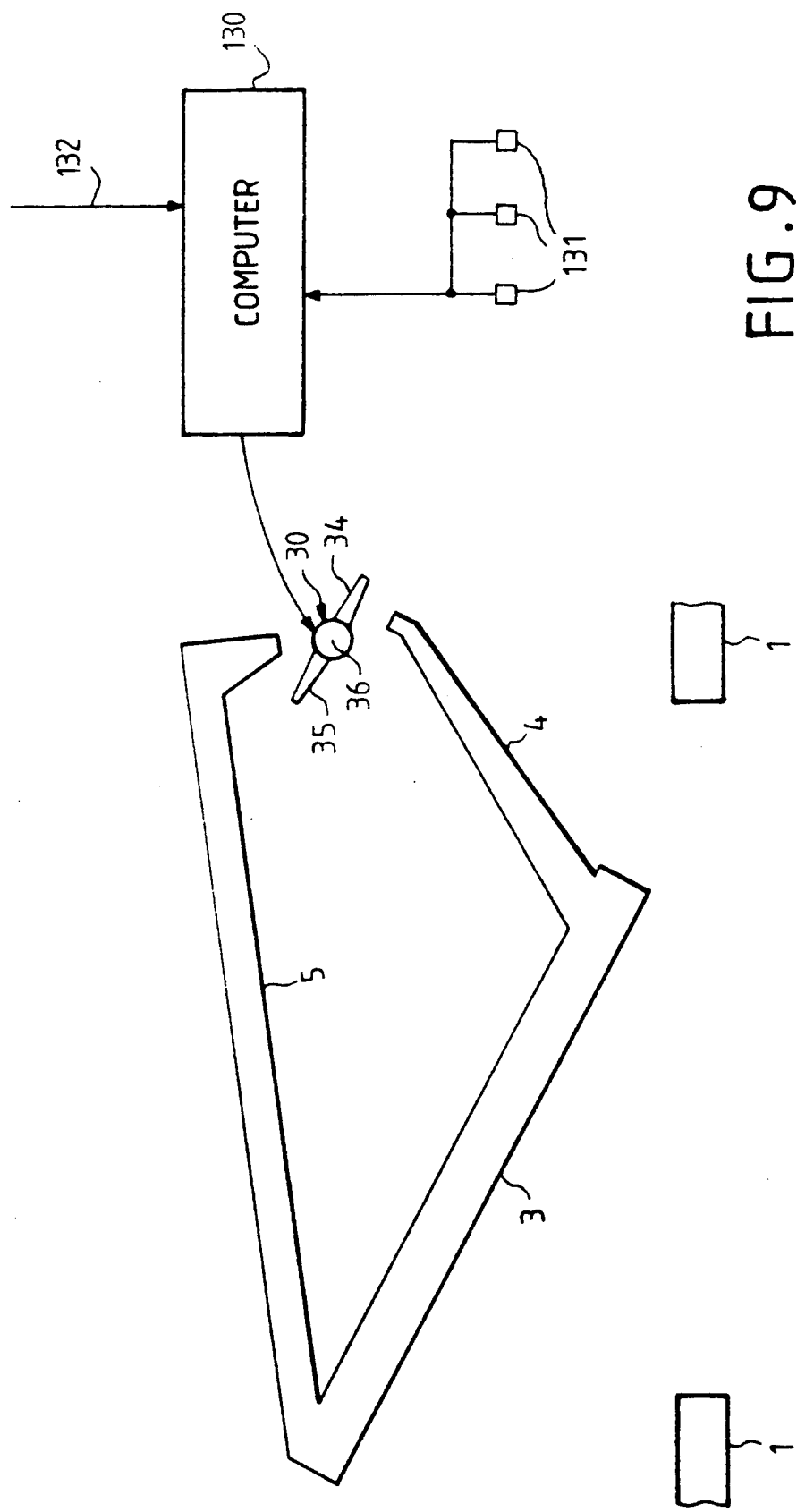
FIG. 9 is a drawing showing the device of FIG. 1, the opening of which has been caused by a pressure difference exceeding a predetermined threshold.

FIG. 9 shows the controlled valve, according to the invention, opened by the difference in pressure. The opening has been got independently of the computer 130 and the arms 35 and 34 of the means 30. Irrespectively of the position of the arms 34 and 35 of the means 30, provided that they do not lock the controlled valve in the closed position, the controlled valve opens automatically in an autonomous way even if, for example, the computer 130 is malfunctioning.

FIG. 4 shows a jack which advantageously forms the positioning means 30. The jacks have an electric motor 40, an actuator 41 and a hub fitted with two arms 35 and 34. The actuator 40 has, for example, gears enabling reduction in the rotation speed. In the example shown in FIG. 4, the arms 34 and 35 are not placed symmetrically with reference to an axis going through the center of the hub. By contrast, in the alternative embodiment shown in FIG. 5, the arms 34 and 35 are arranged symmetrically with respect to the hub 160.

Figure 6:
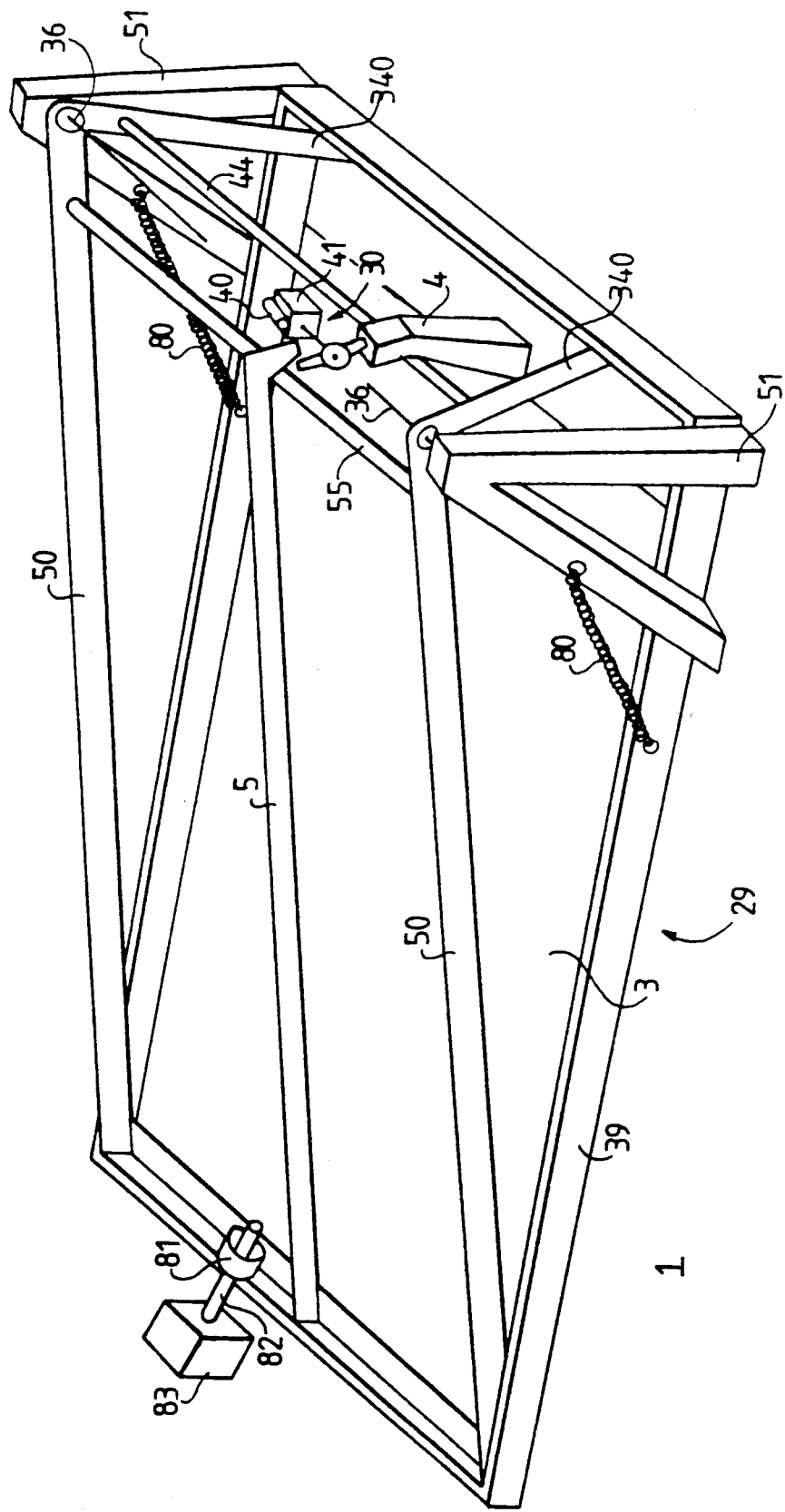
FIG. 6 shows a view in perspective of the device according to the present invention.

FIG. 6 shows a view in perspective of an exemplary embodiment of the device according to the present invention. The flap 3 of the controlled valve 29 has a peripheral reinforcement. The struts 4 and 5 rest on this peripheral reinforcement, at its center. On the sides of the peripheral reinforcement of the flap 3, there are struts 50 and 340 enabling rotation on a shaft 36. The struts 51, which are solidly joined, for example, to the aircraft structure, support the shafts 36. Advantageously, the struts 5 and 50 are connected by a cross-beam 55. Similarly the struts 340 and the struts 4 are connected by a cross-beam 44.

In the normal position of the positioning means 30, the controlled valve 29 is closed by its own weight. However, it is possible to complement the force which closes the controlled valve 29 by having, for example, springs 80 or magnets (not shown). Thus it is possible, firstly, to be able to freely determine the mass of the controlled valve 29 and the surface of the flap 3 and, secondly, to be able to place the controlled valve 29 in any position with respect to the horizontal.

The invention is not restricted to the use of positioning means 30 to provide for the locking of the controlled valve 29. For example, it is possible to use a bolt 81 closed, upon actuation, by a rod 82, shifted by an actuator 83.

The invention is not restricted to the making of "spade" type valves such as those shown in FIG. 6.

Figure 8:
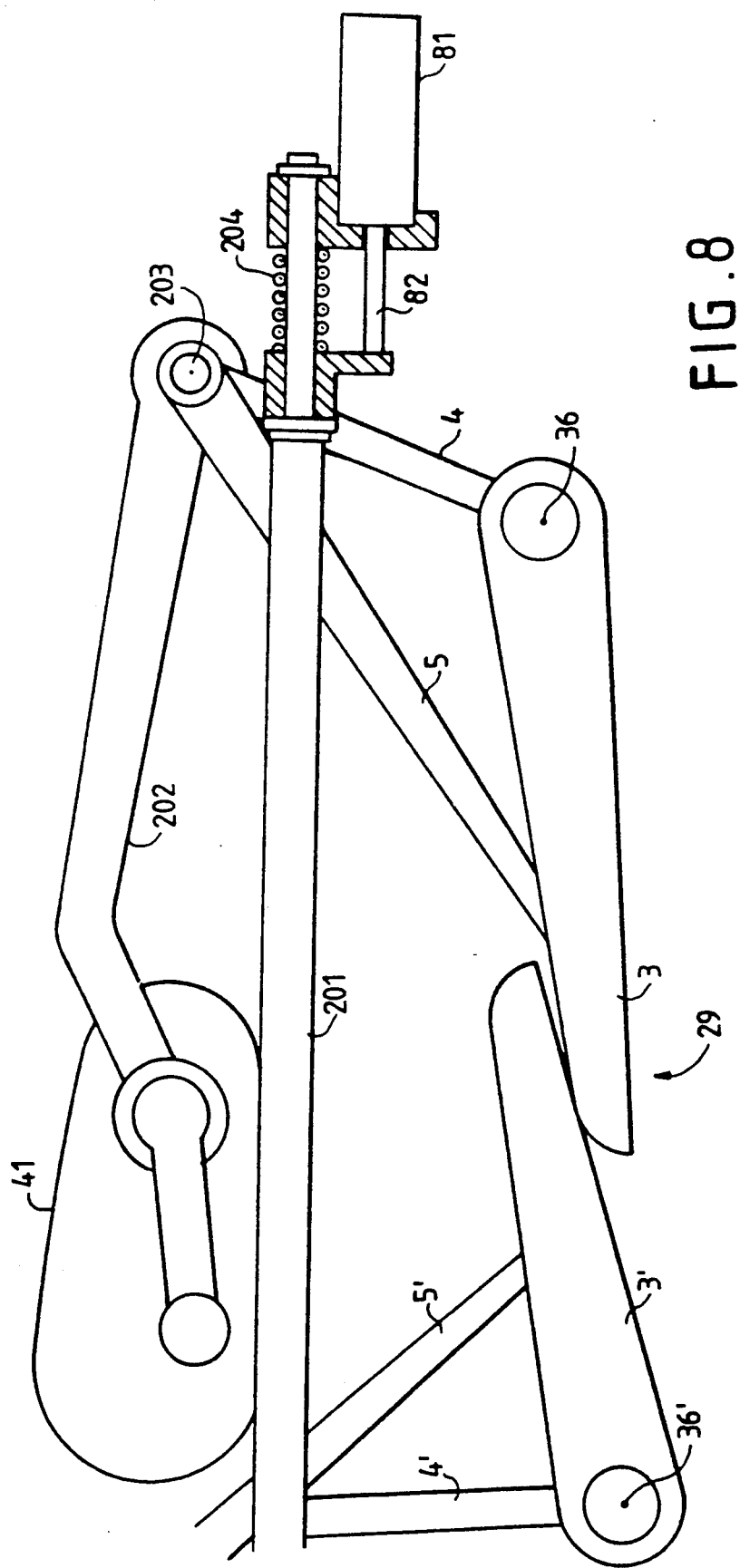
FIG. 8 is a drawing showing an alternative embodiment of the device according to the invention.

The making of butterfly valves or, as shown in FIG. 8, of valves with two thrust recovery flaps does not go beyond the scope of the invention.

The controlled valve of FIG. 8 has a flap 3 for which the opening, upon actuation, is obtained by a set of connecting rods 5, 202, connecting the flap to an actuator 41. The actuator 41 can be driven by a motor, not shown in the figure. In the example of FIG. 8, the opening is done downwards by rotation on the shaft 36.

The controlled valve 29 has a second flap 3'. The flap 3' is driven by a connecting rod 201 connected to the connecting rods 4, 5, 201, providing for the opening of the flap 3. The flap 3 opens towards the top of FIG. 8.

The original feature of the controlled valve 29 according to the present invention, as compared to a prior art pressure recovery valve lies in the fact that the length of the connections rod 201 may vary under the effect of the pressure exerted, for example, on the flap 3'.

In the example shown in FIG. 8, the force coming from a difference in pressure, if it goes beyond a predetermined threshold, compresses a spring 204 and enables the opening of the controlled valve 3'. The spring 204 is compressed only if the pressure exceeds a predetermined threshold. Advantageously, the spring is wholly flattened as soon as the pressure threshold is crossed to enable sufficient opening of the pressure balancing valve.

In an alternative embodiment, the spring 204 is replaced by a mechanical part designed to break when the pressure threshold has been reached.

The opening of the flap 3' enables the pressure to be balanced.

The locking of the controlled valve 29 is, for example, obtained by the use of an irreversible actuator 81 which makes a rod 82 move forward. This rod 82, in resting on a shoulder of the connecting rod 201, prevents the compression of the spring 204.

It is clear that other means of locking such as, for example, a rotating bolt preventing the opening of the flaps 3 and 3', do not go beyond the scope of the present invention.

Similarly, a controlled valve, the flap 3 of which, or the flaps 3 and 3' of which, can open under the action of a pressure difference, do not go beyond the scope of the present invention.

Figure 7:
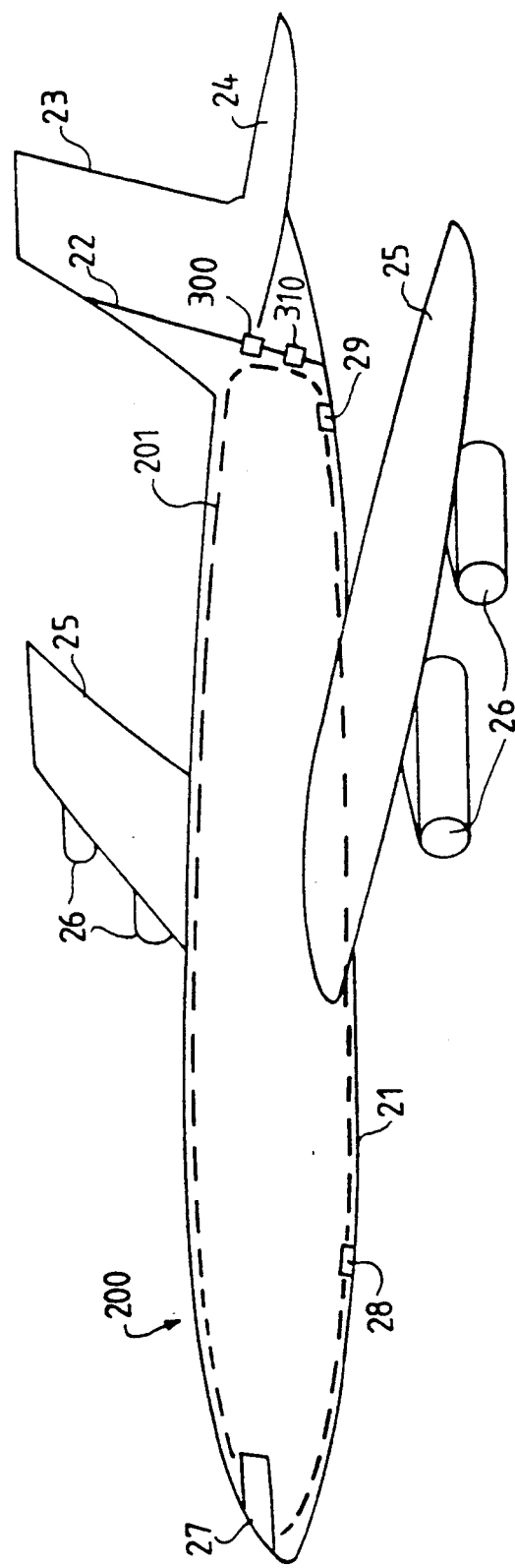
FIG. 7 is a drawing showing an aircraft according to the present invention.

FIG. 7 shows an aircraft 200 according to the present invention. The aircraft 200 has a pressurized chamber 201, two wings 25, for example four engines 26, a rudder 23, two tail units 24 and a cockpit 27.

The pressurized chamber 201 is demarcated by the external structure 21 of the aircraft, called the skin, and by a rear partition 22. The rear partition 22 is relatively brittle to reduce the mass of the aircraft. This pressurized chamber should have two safety valves 300, 310 responsible for limiting, under excess pressure and depression, the pressure difference between the pressurized chamber and the exterior, and thus for preventing any deformation of the structure of the aircraft.

This pressure difference may arise, under excess pressure, from a regulation malfunction and, under depression, from a rapid change in altitude (urgent descent) for example.

It is sometimes necessary to add a further element to the two safety valves if these are not enough to ensure all the safety systems (for reasons of bulk, namely of space needed to house the valves). In prior art aircraft, a depression clack valve is added. This depression clack valve makes it possible to cover cases of malfunctioning in one safety valve and to provide normal conditions of safety with the two safety valves.

The aircraft 200 further has a regulation valve 28 and a ventilation valve 29. The regulation valve is designed to perform what are called "flight sequences" namely, it is designed to regulate the internal pressure so as to ensure the comfort of the passengers. The ventilation valve 29 enables complete balancing of the pressures when the aircraft is at a stop. It must be noted that modern aircraft such as, for example, aircraft of the AIRBUS A300, A310, A320, A330 and A340 series, have large volumes and have the possibility of maneuvering with rapid changes in altitude. Thus, it is imperative to be able to balance pressure very quickly to prevent the structure of the aircraft from being damaged by an excessive difference in pressure. Now, the fact that a safety valve is positioned and that holes are made in the skin of the aircraft presents major drawbacks. Furthermore, owing to the performance characteristics and volume of the aircraft, the safety valves 30 and 31 could prove to be inadequate in the event of a hitch. Thus, it is advantageous to use the controlled valves of FIGS. 1, 2, 3 and 5, to make the regulation valve and/or the ventilation valve to ensure, if this should prove to be necessary, that the internal and external pressures are balanced.

In one exemplary embodiment, the aircraft has no safety valves 300 and 310, where the controlled valves 28 and/or 29 provide for the balancing of the safety pressure.

Advantageously, it is the ventilation valve, normally not active during flight, that would, in the event of a fast descent of the aircraft, autonomously enable the external air to enter the interior in order to achieve a balance of this type.

Advantageously, the controlled valves 28 and 29 are placed in the underside of the aircraft, beneath the waterline. Thus, the maintenance, which can be done from the bottom, is facilitated and, moreover, the flow of air-conditioning air is facilitated, the inlet of this air being located in the upper part of the aircraft. Thus, it is essential, in order to ensure the safety of the aircraft in the case of splash-down, to enable the locking, in closed position, of the controlled valve 29. The blocking is obtained by the operation of the "ditching" switch on the control panel of the aircraft.

The device according to the present invention can be applied to any device for regulating pressure and/or flow rate between a chamber and the exterior or between two chambers comprising a safety balancing device.

The invention can be applied notably to aeronautical construction, to the construction of petroleum refineries and to devices for the distribution of fluids and to chemical reactors.

What is claimed is:

1. An aircraft comprising:
   at least one valve which is to work both as a regulating valve for regulating an internal pressure so as to ensure the comfort of passengers on said aircraft during flight sequences, and as a ventilation valve for balancing external and internal pressures when said aircraft is on the ground;
   means for opening and closing said at least one valve; and
   control means for controlling said opening and closing means;
   wherein said at least one valve can be selectively locked in a closed position, an open position or a partially open position and said opening and closing means can be positioned so as to permit the opening of said at least one valve due to a difference in internal and external pressure independently of said control means.

2. The aircraft according to claim 1, wherein said valve opens towards the inside of the aircraft under the effect of an excessive external pressure.

3. An aircraft according to claim 1, wherein the at least one valve is constituted by two flaps which each comprise two faces and are connected by a connecting rod, and a means which enables the connecting rod to move under the effect of the difference of pressure which exists between the two faces of one of the two flaps.

4. An aircraft according to claim 3, wherein the means enabling the moving of the connecting rod of the valve is a spring.

* * * * *